Oct. 30, 1951     R. M. LOW     2,573,154
ANIMAL GARMENT
Filed Jan. 20, 1950
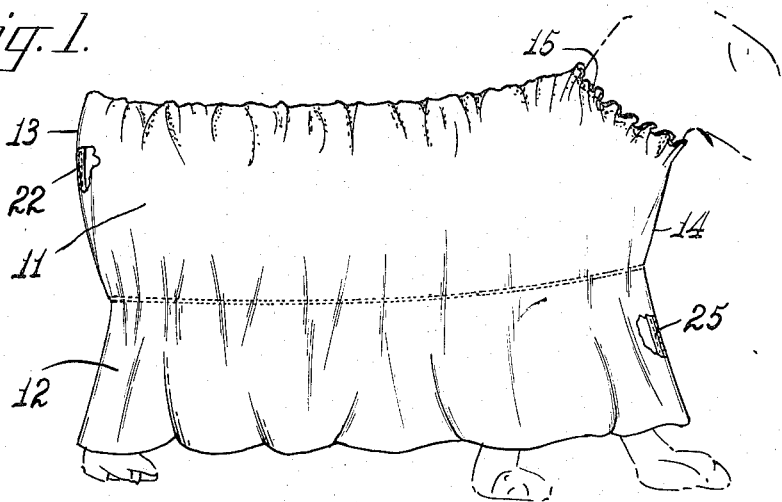
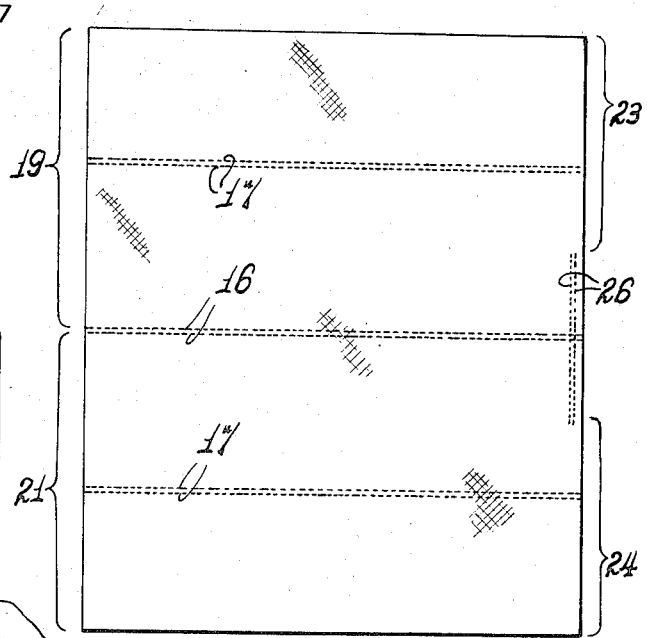
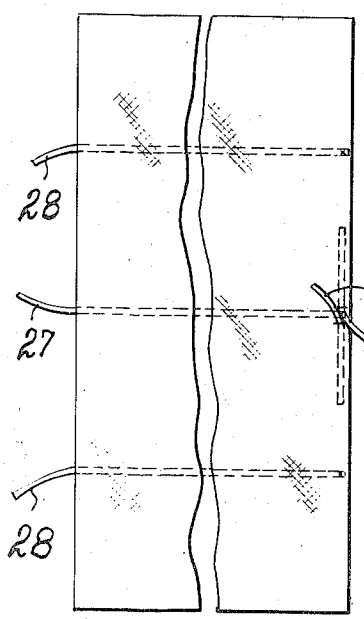
INVENTOR.
RUTH MARTIN LOW
BY
ATTORNEY Patented Oct. 30, 1951

2,573,154

UNITED STATES PATENT OFFICE 2,573,154

ANIMAL GARMENT

Ruth Martin Low, Chicago, Ill.

Application January 20, 1950, Serial No. 139,713

4 Claims. (Cl. 54—79)

The invention relates to improvements in animal garments, and is more particularly concerned with a garment of a character which is easy to put on and to take off an animal.

An object of the invention is to provide an inexpensive garment for an animal, particularly a dog, which will keep the animal warm and dry and will prevent soiling of the interior furnishings of a home or an automobile.

Another object is to provide a garment of the character described which will adequately protect the body and legs of the animal from drafts without restraining movement of the animal in any manner whatsoever.

Another object is to provide a garment of the character described which may be easily and quickly placed in position on the body of an animal and retained in place without the use of retaining devices such as fasteners, leg encircling bands, or the like.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

In the drawings:

Fig. 1 is a view illustrating the garment arranged upon an animal, the latter being shown in broken lines and portions of the garment being broken away to illustrate the seams.

Fig. 2 is a view of a partly fabricated piece of material from which the garment is fashioned.

Fig. 3 is a view similar to Fig. 2, showing a modified form of construction.

Referring to the accompanying drawings, the animal garment embodying the features of the present invention is best illustrated in Fig. 1. The garment is fashioned into a substantially cape-like structure and is adapted to be slipped over the body of an animal in such a manner that it substantially encloses not only the body but also the legs of the animal. As illustrated, the cape-like structure consists of what may be termed a body portion 11 and a skirt portion 12. The body portion overlies the back of the animal and extends downwardly on each side thereof. It is closed at its rear end, as at 13, and its front end is substantially closed, as at 14. A neck opening 15 is provided at its front end. The skirt portion 12 extends entirely around the lower portion of the animal so as to completely encircle the legs.

The construction of the animal garment can perhaps best be understood upon referring to Fig. 2 which is representative of the partially fabricated blank of the material forming the garment. The garment may be fabricated from any suitable sheet material, such as terry cloth or other soft heat retaining preferably absorbent material. The sheet of fabric or other material is blanked out substantially rectangularly in shape. A plurality of parallel rows of stitches 16 and 17 is provided therein, said rows of stitches extending transversely of the sheet in substantially the locations illustrated in Fig. 2. Elastic thread is used to provide the rows of stitches 16 and 17 and, while stitching, the piece of fabric is gathered as is illustrated in Fig. 1.

The piece of fabric is folded either before or after the stitches 17 have been provided therein substantially along the transverse line along which the stitches 16 are provided. This presents two substantially like halves and the complemental edges 19 and 21 are then sewed together, as by stitches 22, so as to close what becomes the rear end 13 of the garment. In a like manner, the complemental edge portions 23 and 24 are sewed together, as by stitches 25, to substantially close the front end 14 of the garment. It will be observed that the complemental front edges adjacent to the rows of stitches 16 are left unsewn. These unsewn edge portions adjacent the rows of stitches 16 define the neck opening 15. It is preferred that the neck opening 15 be gathered together so as to snugly fit about the neck of the animal. To this end, elastic thread is used to provide two rows of stitches 26, which rows intersect the stitches 16 and extend in either direction therefrom the entire length of the unsewn front edge portion.

It should be understood at this time that when the rows of stitches 16, 17 and 26 are sewed in the fabric or other material with elastic threads, the material is gathered so as to insure puckering or gathering of the material throughout the length of the garment and around the neck opening. This adapts the garment for use on animals of various sizes, it being obvious that the garment can be stretched considerably if necessary.

It will be observed further that when the garment is completed, the elastic stitches 17 constitute the division between the body portion 11 and skirt portion 12. Consequently, the bottom margin of the body portion is drawn snugly about the lower region of the animal's body, by reason of said stitches 17, without in any way impairing the freedom of the animal. The depending skirt portion 12 allows for free movement of the legs while at the same time it covers the legs.

Although the use of elastic thread is preferred because it offers maximum stretch with minimum tension, any other yieldable means may be utilized such as, for example, elastic tape, which may be sewed onto the fabric.

The modified form of structure, as illustrated in Fig. 3, is representative of a blank from which the animal garment shown in Fig. 1 may be formed. This blank is in all respects like the blank illustrated in Fig. 2 except that in the present instance drawstrings 27 and 28 are suitably threaded through or otherwise associated with the material in place of the elastic stitches 16 and 17. Similarly, a pair of drawstrings 29 is provided in the margin of the neck opening. When the material illustrated in Fig. 3 is folded and sewed together in the same manner as the material in Fig. 2 is joined, the drawstrings 28 may be tied together so as to snugly conform the lower area of the body portion 11 about the lower regions of the animal's body. Similarly, the drawstrings 29 may be tied together to gather the material around the neck opening snugly about the neck of the animal. The drawstring 27, located in the medial portion of the piece of material shown in Fig. 3, may be pulled outwardly so as to gather the material thereon and then be tied in a knot or otherwise secured to prevent unruffling of the material.

Although exemplary forms of the present invention have been illustrated in the accompanying drawings and have been described in detail in the foregoing specification, it should be understood that the invention may embody a variety of modifications in its structure without departing from the spirit of the invention or the scope of the appended claims.

I claim:

1. An animal garment comprising a body portion that conforms loosely to the general shape of the body of an animal, a surrounding skirt depending from the lower margins of said body portion, an elastic at the juncture of the body portion with the skirt portion to draw the lower margin of the body portion snugly about the lower regions of the body of the animal, and an elastic in the area of the body portion overlying the back of the body of the animal to cause that area of the body portion to conform substantially to the length of the body of said animal.

2. An animal garment comprising, in combination, a substantially rectangular piece of sheet material folded longitudinally upon itself to provide two like halves and having complemental end edges stitched together, a portion of the end edges at one end adjacent the longitudinal fold being left unstitched to define a neck opening, elastic threads surrounding the neck opening and extending along the longitudinal fold, and a row of elastic stitches in each half parallel to the longitudinal fold, said last named rows of stitches dividing the garment into a body portion and a skirt portion.

3. An animal garment comprising a substantially cape like structure including a body portion adapted to substantially envelope the body of an animal and a depending skirt portion adapted to substantially cover the legs of said animal, said body portion having a neck opening at one end, means at the juncture of the body portion with the skirt portion to contract the structure snugly about the lower regions of the body of the animal, and an elastic in the area of the body portion overlying the back of the animal.

4. An animal garment comprising in combination a substantially rectangular piece of sheet material folded upon itself to provide two like halves and having complemental end edges, one of said end edges being completely closed, a portion of said other end edge being partially closed, the unclosed portion of said partially closed end edge defining a neck opening, elastic threads surrounding the neck opening and extending longitudinally of said garment, and a row of elastic stitches in each half parallel to said longitudinally extending elastic threads, said last named row of stitches dividing the garment into a body portion and a skirt portion.

RUTH MARTIN LOW.

REFERENCES CITED

The following references are of record in the file of this patent:

UNITED STATES PATENTS

| Number | Name | Date |
|---|---|---|
| Re. 12,253 | Muntz | Aug. 2, 1904 |
| 935,166 | Rorabeck | Sept. 28, 1909 |
| 1,035,671 | Zavodnik | Aug. 13, 1912 |
| 1,538,596 | Schroedter | May 19, 1925 |
| 2,131,495 | Allen | Sept. 27, 1938 |
| 2,183,828 | Trubitz | Dec. 19, 1939 |
| 2,273,706 | Hafner | Feb. 17, 1942 |
| 2,443,831 | Miller | June 22, 1948 |